(12) United States Patent
Lo (10) Patent No.: US 6,311,479 B1
(45) Date of Patent: Nov. 6, 2001

(54) MODULAR CRYOGENIC SOLID FUEL ROCKET DRIVE SETS

(76) Inventor: Roger E. Lo, Senheimer Str. 43, D-13465 Berlin (DE)

( * ) Notice: Subject to any disclaimer, the term of this patent is extended or adjusted under 35 U.S.C. 154(b) by 0 days.

(21) Appl. No.: 09/459,764

(22) Filed: Dec. 13, 1999

(51) Int. Cl.$^7$ ...................................................... F02K 9/72
(52) U.S. Cl. ............................. 60/256; 60/253; 60/255
(58) Field of Search ............................ 60/253, 255, 256, 60/219

(56) References Cited

U.S. PATENT DOCUMENTS

| | | | |
|---|---|---|---|
| 1,670,689 | * 5/1928 | Olmstead | 264/3.1 |
| 3,090,196 | * 5/1963 | Brewer | 60/35.6 |
| 3,137,127 | * 6/1964 | Grosse | 60/35.3 |
| 3,204,560 | 9/1965 | Gustavson. | |
| 3,572,040 | * 3/1971 | Dreyer | 60/256 |
| 3,807,171 | * 4/1974 | Anderson | 60/255 |
| 3,995,559 | 12/1976 | Bice et al.. | |
| 5,463,954 | * 11/1995 | Blair | 102/202 |

FOREIGN PATENT DOCUMENTS

| | | |
|---|---|---|
| 976057 | 1/1963 | (DE). |
| 1114843 | 5/1954 | (FR). |

* cited by examiner

Primary Examiner—Timothy S. Thorpe
Assistant Examiner—Ehud Gartenberg
(74) Attorney, Agent, or Firm—Jordan and Hamburg LLP (57) ABSTRACT

Modular, cryogenic, solid rocket propellants of different fuel components, such as fuels, oxidizers, energy-increasing admixtures, binders, additives, etc., for all applications of solid rockets produce a uniform, stable and complete combustion, This objective is accomplished since one of the fuel elements, due to the special selection of its composition, is provided as a permanent igniter generator of the modular propellant.

11 Claims, 11 Drawing Sheets

MODULAR CRYOGENIC SOLID FUEL ROCKET DRIVE SETS

BACKGROUND OF THE INVENTION

The invention relates to modular, cryogenic, solid rocket propellants with fuel elements of different fuel components, such as fuels, oxidizers, energy-increasing admixtures, binders, additives, etc., for all conventional and other applications of solid rockets.

The invention relates to the technical field of rocket engines and to the manufacture, construction, ignition and combustion construction and the safe storage of cryogenic, modular, solid propellants. In this field, solid propellants are understood to be simple or assembled fuel blocks, which are present in a particular geometric shape, which determines the development of the combustion rate and, accordingly, the propulsion unit as a function of time. The propellant systems can include fittings and extensions, which are mounted according to the state of the art for mechanical reasons as seals, combustion inhibitors or for other reasons and are generally consumed during the combustion.

State of the art solid rocket fuels are propellants of double-base fuels or composite fuel or of combinations of both. To increase the energy, metals such as aluminum may be added. Other additives are added in order to influence the burning behavior, chemical stability or mechanical properties. The components are mixed, shaped and cured into molded objects, which are solid at room temperature, by ingenious methods. Such fuels are referred to as "monergols" (single component systems). According to the state of the art, solid monergol fuel blocks can be stored at a defined temperature range, which includes ambient temperature, such as −30° to +80° C., without melting or changing otherwise within a short period of time. The propellant may contain regions of different compositions and therefore different burning rates (for example, in the so-called dual propellant grains). All aforementioned propellants are referred to in the following as "conventional propellants", irrespective of the fact that these may also contain very exotic components. Conventional solid propulsions have pulses of low to moderate energy ("IsP", a measure of the quality of the fuel as a rocket fuel, the units being in seconds), generally far below 300 seconds. They are produced in very different geometric shapes, but can be divided roughly into two categories, namely into internal burners, which burn off in a more radial direction, and end burners, which burn off in a more axial direction.

Aside from monergolic fuels, fuels are also known, which contain the combustible material and the oxidizer as separate elements in different geometric arrangements. Such arrangements are referred to here as "modular propellants". Modular propellants have the advantage that the burning in diffusion flames takes place as so-called boundary burning, for which the transition to uncontrolled explosions or detonations cannot take place or cannot easily take place. Modular propellants with storable components previously were used only in the form of "sandwich propellants" (with an arrangement of the elements, as in the case of internal burners) and only for burning trials, since the burning properties of monoergolic mixtures are superior to those of modular propellants (see, for example, HANDLEY, J. C., et al., "Combustion of ammonium perchloratepolymer sandwiches", AIAA Journal, 1981, Vol. 19, pp. 380–386). In the area of conventional solid fuels, modularity is of no advantage.

Of the modular fuels, those with encapsulated components form a separate group. The objective of the encapsulation is to mutually separate reactive components and to improve long-term storability. Liquids or very sensitive reactants can be enclosed in capsules. Small capsules are enclosed non-directionally in binders. Macrocapsules can be disposed, aligned and cast with a binder or a curing solid fuel. As the size of the capsule increases, the transition to certain modular fuels is progressive (McCurdy, R. M. et al., "Solid Propellant Grain Containing Metal Macrocapsules of Fuel and Oxidizer", U.S. Pat. No. 3,527,168). As the capsules increase in size to that of rods, as, for example, in the case of modular "rod-in-matrix" propellants, the method of combusting liquids is no longer suitable and, in the case of solid fillers, any type of covering can interfere with the combustion.

A different principle has been proposed, for which the heat of a burning monergol through heat-resistant walls is used for the pyrolysis of fuels and oxidizers, which are then combusted in their own combustion chamber. The geometric arrangement of such pyrolysis elements can be very similar to the geometry of modular fuels (see DE 976 057). On the other hand, the principle of functioning is completely different and the elements, when fitted together, form a rocket with a combustion chamber and nozzle and not a propellant.

Aside from storable solid fuels, frozen fuels were proposed, the components of which are liquids or gases at ambient temperatures. Such fuels are referred to here as cryogenic solid propellants, which is abbreviated as CSP. Monergolic CSP consists of frozen monergols, which are liquid at room temperatures. Modular monergols are composed of frozen elements which, by themselves, are not combustible.

According to the state of the art for modular, cryogenic solid fuel rocket propellants, the fuel elements are isolated chemically from one another by suitably covering the interfaces (U.S. Pat. No. 3,137,127). In particular, the fuel elements can have the shape of disks, the outer surface of which is adapted to the contour of the rocket combustion chamber, while internally one or more boreholes with appropriately shaped cross-sectional surfaces can be present which, by being Linked together, form one or more combustion channels with a constant or variable cross-sectional surface.

The burning of modular fuel elements, which are not monergolic, basically is a diffusive boundary layer burning and, as such, depends on the inflow of reactants. When this inflow is not vigorous, but the result of convection, the reaction is irregular and sluggish, if it takes place at all. This is always the case in internal burners for the uppermost element (furthest away from the nozzle) and, in end burners, from a certain minimum cross-sectional area of the elements onward. Accordingly, convection does not represent a suitable basis for burning in closed combustion chambers, so that the cryogenic modular propellants of U.S. Pat. No. 3,137,127 are not suitable for use.

Recently, cryogenic solids have also become interesting as a base for so-called super high energy chemical fuels (SHET), which consist of energy increasing additives. In the United States (see Carrick, Patrick G., "Theoretical performance of high energy density cryogenic solid rocket propellants", U.S.A.F., Phillips Lab., Edwards A.F.B., Calif., 1995, AIAA-Paper-95-2892), theoretical and experimental investigations have been conducted since 1994 on cryogenic hybrids (that is, diergolic rocket propulsions with a solid and a liquid component). These include also those with frozen fuels, such as hydrogen or kerosene. For hydrogen, the inclusion of atomically dispersed materials is proposed, the high heat of formation of which causes them to be super high energy chemical fuels. The matrix isolation in the hydrogen ice prevents their premature recombination.

Until now, only conventional, storable monergolic solids have been used in practical applications. Modular and encapsulated fuels are not realized either with storable components or with cryogenic components. Aside from the fact that many of the promising fuel components proved to be too poisonous or too corrosive, this is due primarily to the fact that, compared to conventional, monergolic propellants, most of the unconventional propellants described above have a very unsatisfactory burning behavior.

The invention is therefore based on the following problems, all of which show the advantage of using cryogenic, modular solid propulsions. Conventional, monergolic propellants require the processing of large amounts of materials, which basically are explosive. The processing therefore is dangerous and expensive. Modular propellants would therefore be very desirable, because their processing is much simpler. To improve their long-term shelf life, conventional monergolic propellants require certain additives. Nevertheless, however, they are subject to irreversible chemical aging processes. Modular CSP propellants do not need such additives and would be more advantageous because of their much simpler chemical composition. Conventional propellants, insofar as they contain ammonium perchlorate and/or aluminum, greatly contaminate the environment with their exhaust gases. CSP propellants can be prepared on the basis of environmentally friendly liquid fuel combinations. The energy content (IsP) of conventional propellants can be increased only by expensive and dangerous fuel components. Even then, however, the power attained falls far below that of liquid propulsion of moderate to high energy. CSP propellants could make the fuels for liquid propulsion available for solids engines.

The classical fuel combinations with the highest, known, specific pulses require the combustion of metal and so-called chemical hydrogen heating. These triergols cannot be realized in liquid propulsions. Tribrid propulsions (i.e., hybrids with metallized fuel grains, which are combusted by injecting in an oxidizing agent, while additionally hydrogen is being injected in) are complex and difficult to control. The same is true for conventional solid fuels, which are filled with metal and work with hydrogen injection (so-called quasi hybrids). On the other hand, CSP propellants would be exceptionally suitable for metal additives.

Because of the chaotic development of the burning surface, hybrid propulsions tend to deviate greatly from the desired mixing ratio and run very roughly. Modular CSP propellants would be much more suitable for realizing the SHET power units.

SUMMARY OF THE INVENTION

It is therefore an object of the present invention to arrive at a uniform, stable and complete combustion in modular CSP propellants and to solve some or all of the problems described above.

Depending on the combination of the distinguishing features of the present invention some or all of the problems listed can substantially be eliminated. The invention permits fuels and oxidizers to be selected from a wide range of materials and combusted effectively as fuel elements (modules). The desired thrust-time relationship arises from the geometry of the fuel. Furthermore, this geometry permits cryogenic modular propellants to be produced in situ, that is, in the combustion chamber and, if necessary, the fuel to be removed therefrom.

Due to the use of modular, cryogenic fuel domains with igniter generator or gas, generator properties, a propellant results, which is built up from fuel elements (modules) with different functions. Internal interactions are possible between these modules. As a result, the combustion of propellants, which may be built up from fuel combinations, becomes possible. The performance of these propellants far exceeds that of classical solid propellants.

The macroscopic degree of mixing (measurable and definable as the average distance of the centers of gravity of the different fuel elements), is determined by the selection of the absolute size of the fuel elements. This selection affects the average burning rate of the propellant, which thus can be varied while the overall composition is kept constant.

Smaller fuel elements lead to a higher regression rate. This is one degree of freedom which conventional propellants do not have. Furthermore, the composition, arrangement, shape and dimensions of the fuel elements affect the ignition behavior and burning behavior. In general, it is to be expected that, without additional measures, modular propellants behave less advantageously than do monergolic propellants.

Modular propellants of the present invention are built from storable and cryogenic solids (or only from the latter) consisting of separate oxidizer elements and fuel elements. Through the agency of at least one permanent igniter generator (which, thus acts as igniter and sustainer, that is, initiates and maintains the combustion), at least one of these elements is caused to melt and/or evaporate in such a manner, that it now becomes, in turn, the source of reaction partners for the evaporation products and decomposition products of other modules, including also those of the igniter generator, in the event that the latter generates reducing or oxidizing gases.

By means of this arrangement, it is achieved that there are no burning surfaces, which depend on reaction partners being supplied. In the combustion chamber, a regime, of interfacial combustion results, in which diffusion flames are formed simultaneously over fuel surfaces (as in regular hybrid propulsion) and oxidizer surfaces (as in the case of inverse hybrids). A solid propulsive unit with alternating modules of this type would behave like a chain of "internal hybrid propulsions". Likewise, alternating fuel and oxidizer gas generators are conceivable, the products of which react with one another in the gas phase with a high degree of efficiency. Of course, in addition, the processes of the monergol combustion take place over the surfaces of the igniter elements and, if present, of the gas generator elements. It is evident that the igniter generator can more or less also assume the functions of the gas generator.

The advantages described below can be achieved with the invention.

The propellants of the present invention appreciably simplify the production of solid propellants. Many dangerous procedures are avoided and repetitive production becomes an option. Considerable cost reductions can be anticipated. The propellants permit any combination of fuels to be realized as monergolic fuel propulsion. These combinations range from storable or cryogenic liquid monergolic and diergolic propulsions over hybrid and quasi hybrid propulsions, suspension (slurry) propulsions and tribrids up to all types of triergols. Drastic increases in the IsP not only in comparison to conventional solid fuels, but also in comparison to liquid propulsions, are therefore to be expected. In this connection, refer to LO, R. E., DFVLR-Stuttgart: "Chemische Wasserstoffaufheizung durch tribride Verbrennung (Chemical Hydrogen Heating by Tribrid Combustion)", Chemie-Ingenieur-Technik (1967) 39, Vol. 15, pp.923–927; LO, R. E.: Technical Feasibility of Chemical Propulsion System With Very High Performance, Proceedings of the XVIIIth Astronautical Congress, Belgrade, Sept. 25–29, 1967, pp. 121–132; LO, R. E. DFVLR-Lampoldshausen: "Theoretische des Raketentreibstoffsystems $Fe_2$, $O_2$/LiH, $Al/H_2$ and einfacher Teilsysteme (Theoretical Aspects of the Rocket Fuel System $Fe_2$, $O_2$/LiH, $Al/H_2$ and of Simple Part Systems)", DLR-Mitt. 69–21 (December 1969); LO, R. E., DFVLR-Lampoldshause: "Chemische Wasserstoffaufheizung durch Verbrennung von Aluminum mit Sauerstoff oder FLOX (Chemical Hydrogen Heating by Combusting Aluminum with Oxygen or FLOX)", DLR-Mitt. 70–03 (February 1970); LO, R. E., DFVLR-Lampoldshausen: "Quasihybride Raketenantriebe (Quasihybrid Rocket Propulsion)", Raumfahrtforschung, Vol. 4, April 1970).

By a suitable selection of fuels, the propellants of the present invention permit solid propellants to be realized with the least possible contamination of the environment (such as solid hydrogen/solid oxygen propellants).

The invention will be described in greater detail below in several examples in the drawings.

BRIEF DESCRIPTION OF THE INVENTION

Figure 1:
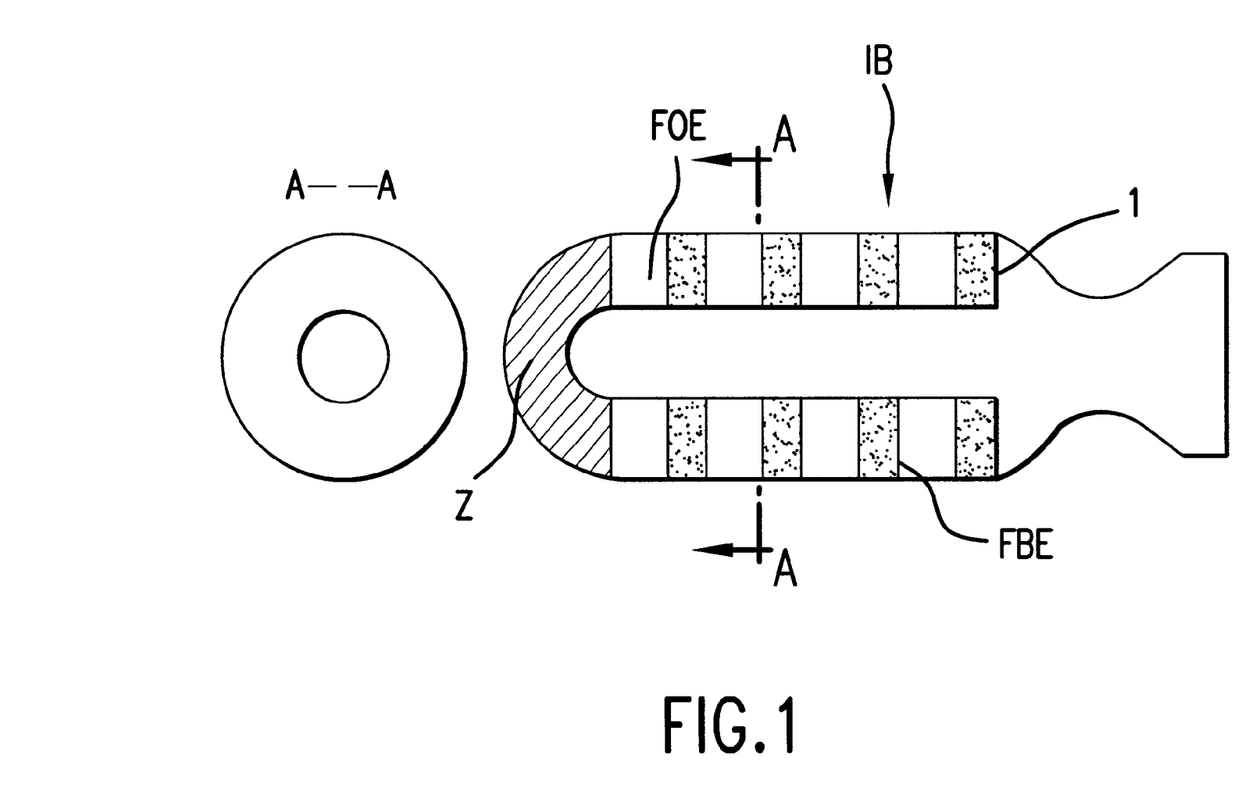
FIG. 1 shows a diagrammatic view of an internal burner (disk stack burner) with an igniter generator, including section A—A.

FIG. 1 diagrammatically shows an internal burner (disk stack burner) IB of disk-shaped or cylindrical, modular construction. The internal burner IB comprises disk-shaped solid oxidizer elements FOE, which are linked together, and solid fuel elements FBE.

An igniter generator Z is disposed in the stagnation zone of the internal burner IB at the closed end of the combustion chamber. It consists of a suitable self-burning monergol. Its own ignition device is not shown. Without the igniter generator Z, the first solid fuel element FBE would burn very poorly, if at all, especially in the usual vertical position of rocket propulsion units. In the highly diagrammatic representation of FIG. 1, the solid fuel element is covered at the downstream end of the propellant with an inhibitor I. In real propulsion units, its place can be taken by a further gas generator element, which contributes to increasing the efficiency of the combustion and to the film cooling of the nozzle.

The aging rate of the individual elements is decreased drastically by insulating layers at the interfacial surfaces. Very reactive fuels can be brought together, for example, those which would be hypergolic, that is, self-igniting, in the liquid state. Together with lowering the general reactivity at low temperatures, the use of very sensitive monergols, such as ozone or mixtures of ozone and oxygen, can also become possible by these means.

Figure 2:
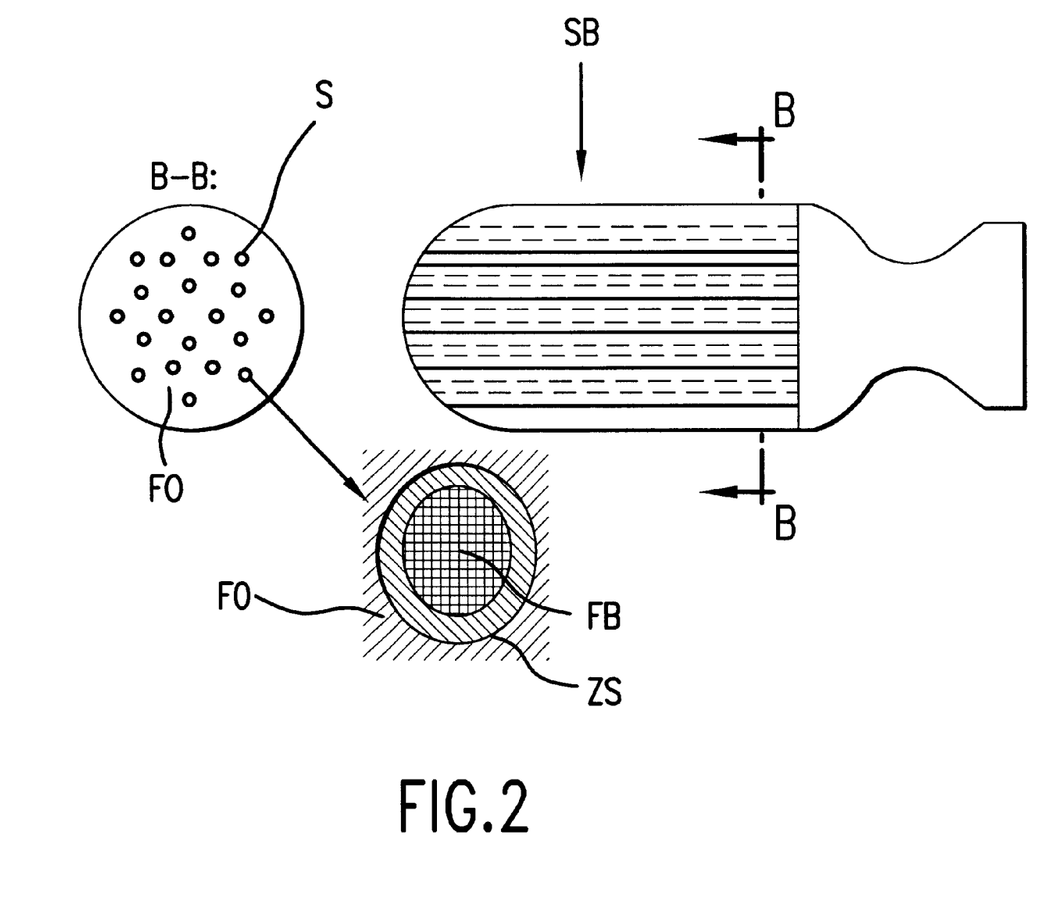
FIG. 2 shows a diagrammatic view of an end burner (rod-in-matrix) with an enveloping igniter generator, including section B—B.

In FIG. 2, a rod-in-matrix end burner SB of modular construction is shown diagrammatically. One component, for example, the solid oxidizer FO, coherently fills the combustion chamber while the solid fuel FB is embedded therein in the form of rods. The rods S are in each case enveloped by an igniter layer ZS. The igniter layers ZS can be omitted if at least one of the components has a composition, appropriate for taking over the function of the igniter layers and thus itself becomes the igniter generator.

In the case of the internal burner IB, the terminal igniter generator Z, shown in FIG. 1, can be a conventional solid propellant with an appropriate burning rate. It burns for the duration of the combustion. The same is true for the igniter layers ZS in the case of the end burner of FIG. 2.

The size relationships in FIGS. 1 and 2 are meaningless, since they only represent examples. The cylindrical inner burner is only a special case of a burner with disk-shaped fuel elements, from which one or several combustion channels with quite different geometric shapes can be constructed.

Likewise, the end burner, shown in FIG. 2, is only an example of many different possibilities for shaping the fuel elements. Whether the matrix is formed by fuel or oxidizer depends on the fuels selected and on their volumetric relationships.

The same purpose of improving and stabilizing the combustion is the objective of the fuel elements, which function as gas generators which interact with one another and with the remainder of the propellant and are able to promote and make possible the combustion. Oxidizing hot gas generators are outstanding for use with combusting solid fuels, such as metal powders.

As a further degree of freedom, modular arrangements of elements of internal burners and end burners can be combined together, for example, in the form of radial rods of the one component in a cylindrical matrix of the other component.

The casings, described below, make the functions set forth below possible.

Direct and constant cooling of the cryogenic fuels in the propulsion unit, in contrast to indirect cooling through the wall of the combustion chamber is possible.

Integration of the empty casings at room temperature, and later, in situ production of the frozen blocks of propellant by providing coolant as well as fuel gases or fuel liquids avoids the handling of cold individual elements.

Under conditions outside of the design limits of the casing, a safe overflow and pressure equalization is ensured in the event that the cooling system fails.

Individual suspension of the modules, which then are no longer connected directly to one another, solves the problem of fastening (case bonding), reduces the load on the module and increases the available clearance for thermal expansion.

In preparation for these functions, the construction of modular propellants of the present invention was conceived as described below.

All or individual modules of the inventive propellants are surrounded by a casing, which has sufficient strength and is adequately compatible chemically with the fuel.

Figure 3:
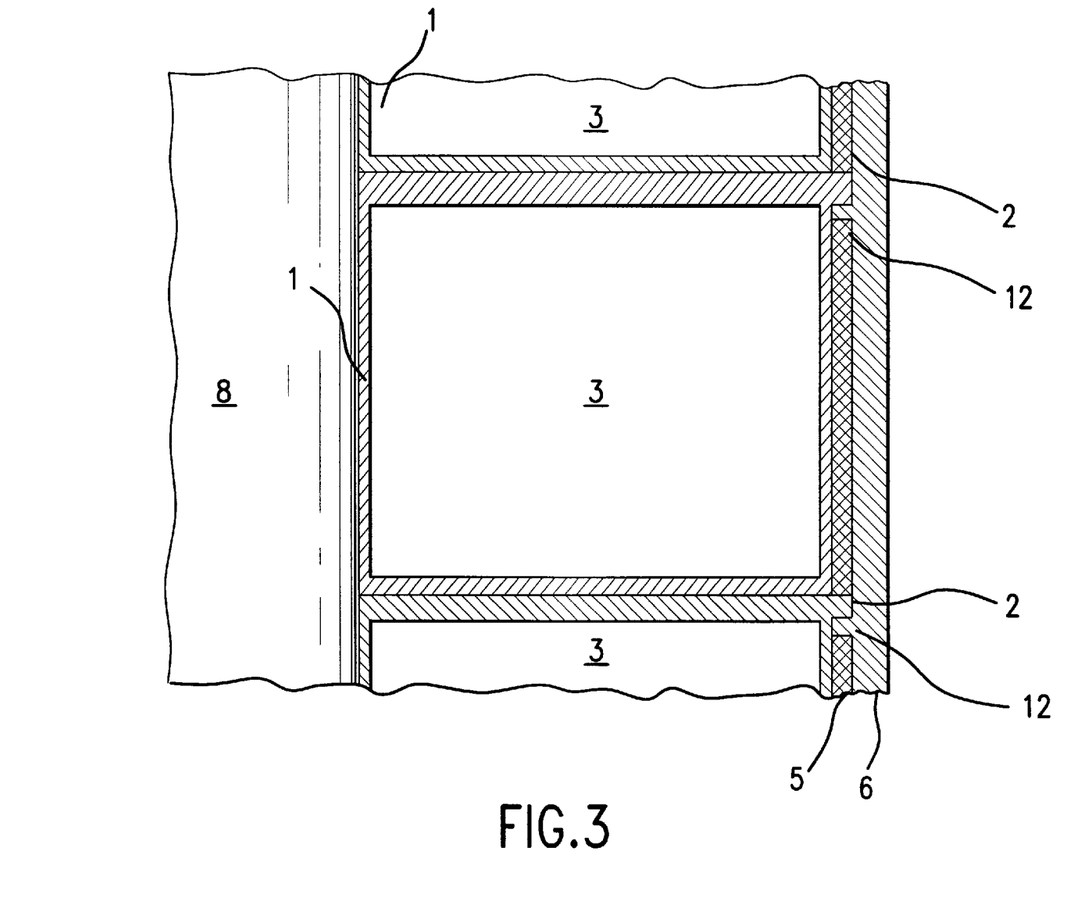
FIG. 3 shows a section through a fuel element of an inventive, hollow, cylindrical propellant.
Figure 4:
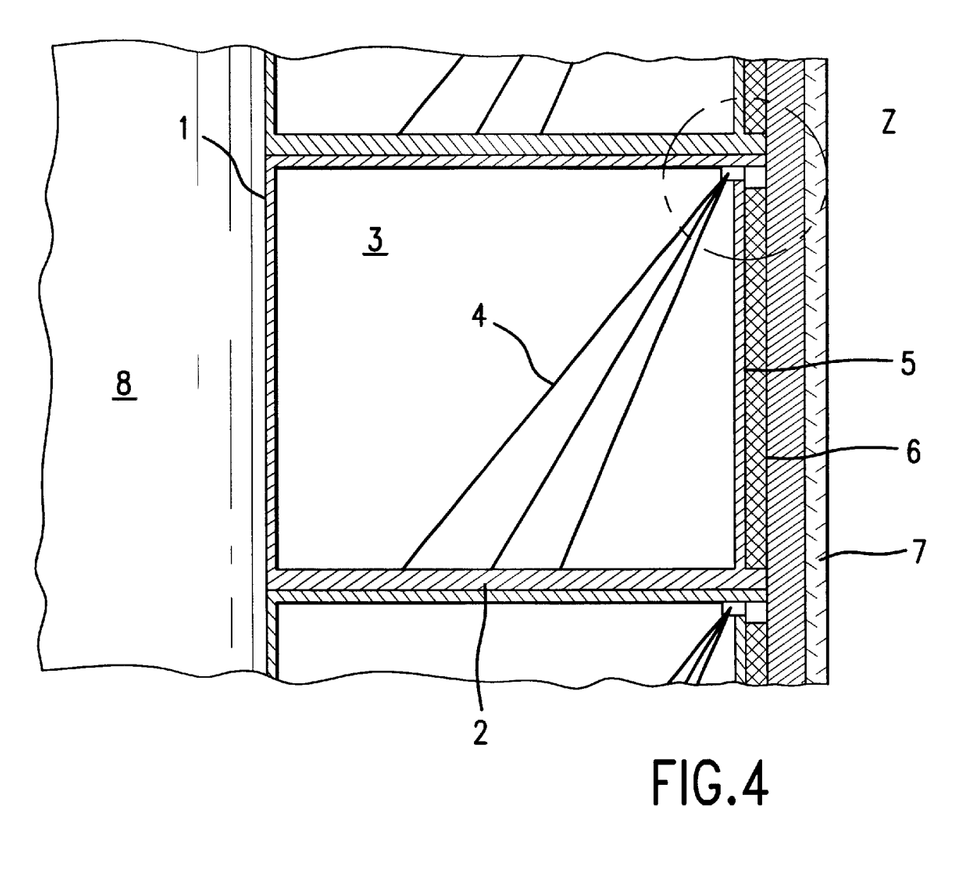
FIG. 4 shows the fastening of the solid fuel by means of extension-resisting elements.

FIG. 3 shows a section through a fuel element of a hollow cylindrical propellant. The casing 1 encloses the fuel 3. In this case, it is composed of cylindrical or circular surfaces, which are, for example, glued together during the manufacture (the manufacturing methods are not dealt with further here). A protruding edge of the casing 1 forms a support 2 for the element, which lies on a support 12 of the combustion chamber wall 6 and can be fastened to this support 12 by a bolted connection as shown in FIG. 4.

Figure 5:
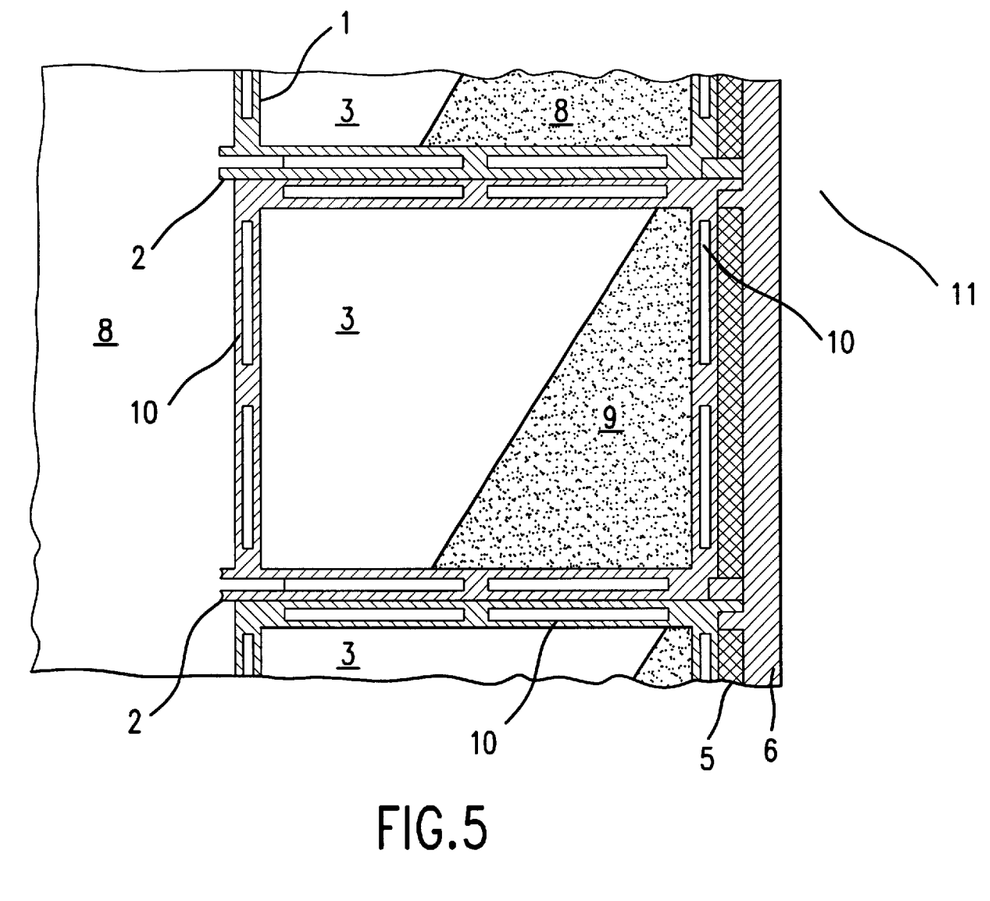
FIG. 5 shows the standard solution of the struts of the inventive propellant.
Figure 6:
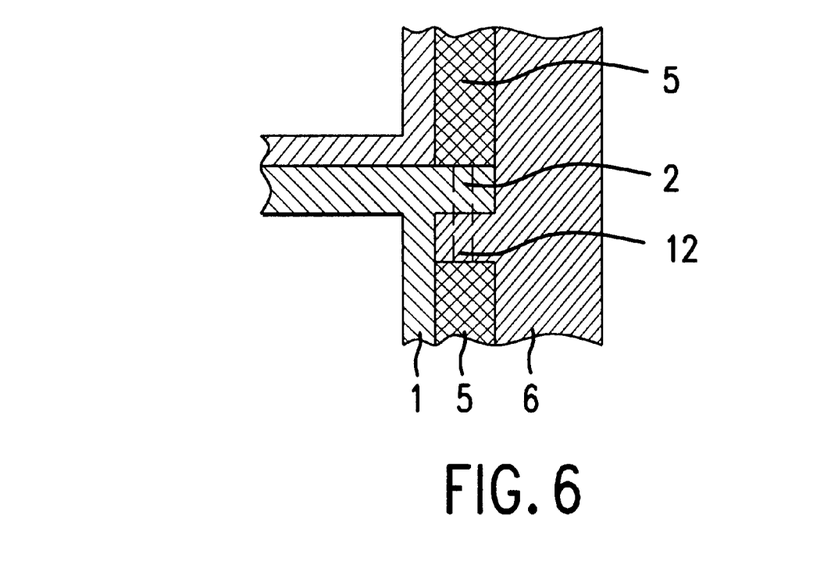
FIG. 6 shows a farther variation of the support of the casing.

Contrary to what is shown in FIG. 3, this support can, of course, also be located equally well at the lower end of a module. By inserting an installation ring 11 as shown in FIG. 5, support at both ends of cylindrical modules is achieved.

Upon ignition of the encased propellants, an igniter (generated, for example, by a module, which is located at the head end of the combustion chamber and consists of a self-burning solid fuel mixture-see FIG. 1) initially burns away part of the casing, which forms the surface of the combustion channel 8. This process changes over seamlessly into the evaporation and ignition of alternating modules of oxidizer and fuel. It is evident that the casing 1 must, on the one hand, be as thin as possible and, on the other, as thick as is necessary. In addition, the end surfaces of the casing 1, which see the interface flame in the combustion channel 8, should have, as far as possible, the same burning rate as the fuels. This can be influenced by the choice of material. Geometric shapes of the fuel which expose the inner side of the combustion chamber wall 6 to flames for different periods of time (for example, the Konozyl burner or the end burner), additionally require an internal thermal protection layer 5.

For the installation, it is necessary to differentiate between segmented and nonsegmented combustion chambers. The former require a definite sequence. If certain assumptions are made, each module can, at the same time, also form a combustion chamber segment. The fuel, casing, suspension, insulation and combustion chamber segment can then be prepared jointly. However, as a rule, the grain will have to be built up from the top to the bottom. The problems presented are very specific for the example. Special shapes and any other geometric shapes arise out of the desired thrust-time curve of the propulsion unit, the fill factor at the same time being high. Of course, it must be possible to install all shapes together with the casings, insulating layers, suspensions, etc.

The brittleness of ice blocks, especially below the glass transition temperature, can be a problem, particularly when these blocks are subjected to dynamic loads. As a solution, the use of ice crystals, which possibly are metamorphic under pressure, comes into consideration. In a composite, the ice crystals are less brittle similar to the difference between snowball and an icicle. Blocks of snow of water ice can carry quite a load (igloo principle); however, this situation could be quite different in the case of frozen fuels. By attachment to the combustion chamber wall, the strength demands can be reduced appreciably. Under the conditions of flight acceleration, the fuel blocks, instead of having to carry all the elements lying above, need now only be stable.

For such fuels, FIG. 4 shows a type of fastening with anchoring wire 4. This has the advantage that, aside from fuel, little, additional material, which changes the overall composition of the fuel core, is added to the casing material.

Figure 7:
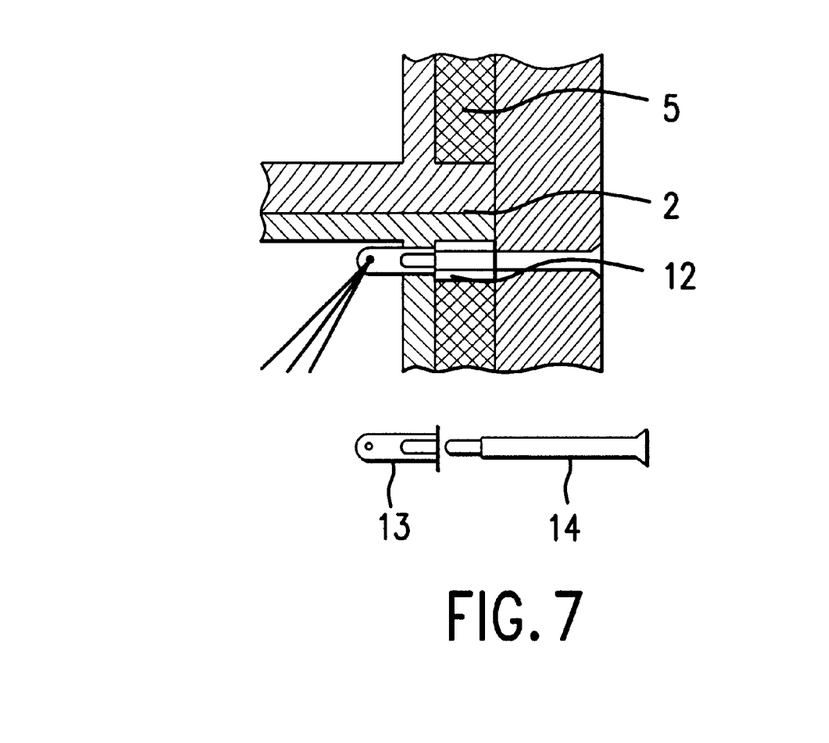
FIG. 7 shows a variation of the attachment of the extension-resisting elements with a connector holding fixture.

On the other hand, FIG. 5 shows a standard solution of the struts 9 of a box, which admittedly are easier to install, but contribute further surfaces of mantle material. In selecting the number and arrangement of the anchoring wires, it should be taken into consideration that these burn as soon as the burning surfaces reach them. For the assembly, initially the wires 4, which are fastened to the base plate in a suitable manner (not shown), are connected with a plug fixture 13 as shown in FIG. 7, which sits tightly in the outer surface of the casing 1 and is protected by a suitable shape against twisting. Together with the plug fixture 13, the wires are embedded in the fuel during the filling and sealing of the fuel element. After the fuel element is inserted in the combustion chamber (or into the wall segment of the latter), the whole is fastened from the outside by tightly seated plug screws 14. Seals and other details are not dealt with here. A thermal protection layer, TPS, 7 in FIG. 4, which may be required, is mounted subsequently in this case.

According to a further example, casings, which can be cooled, can be constructed as double walls, as shown in FIG. 5. In this case, cooling channels 10 pass through the individual casing surfaces in such a manner, that each fuel element has at least one inlet and one outlet.

Figure 8:
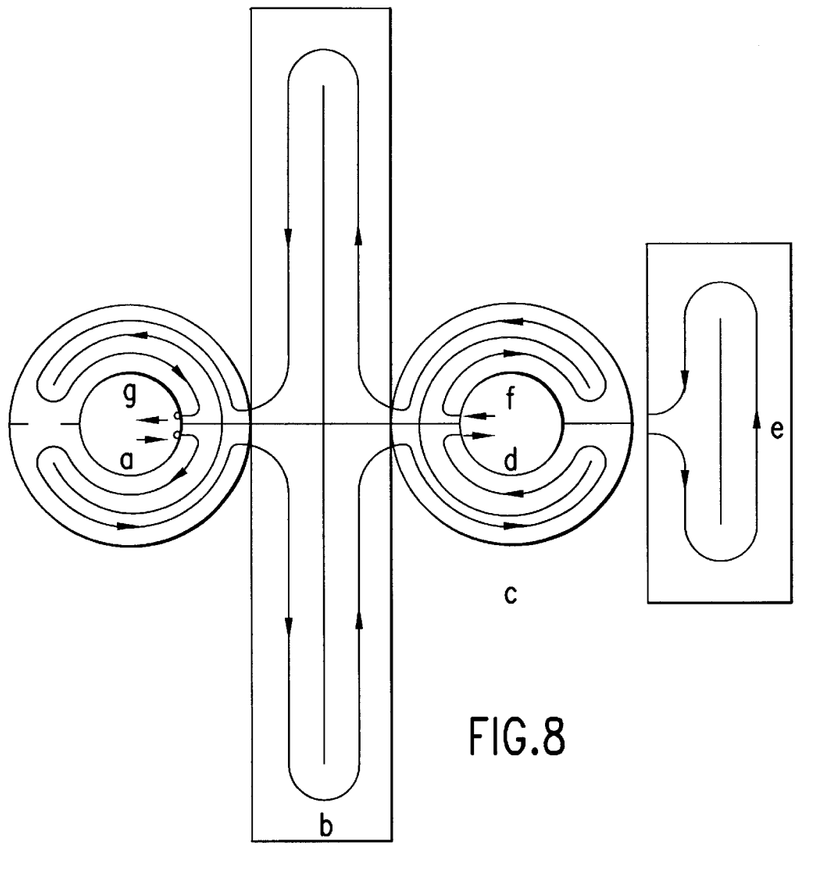
FIG. 8 shows a representation of the double wall casing of hollow cylinder rings with a pipe system for cooling, formed by cross members.
Figure 9:
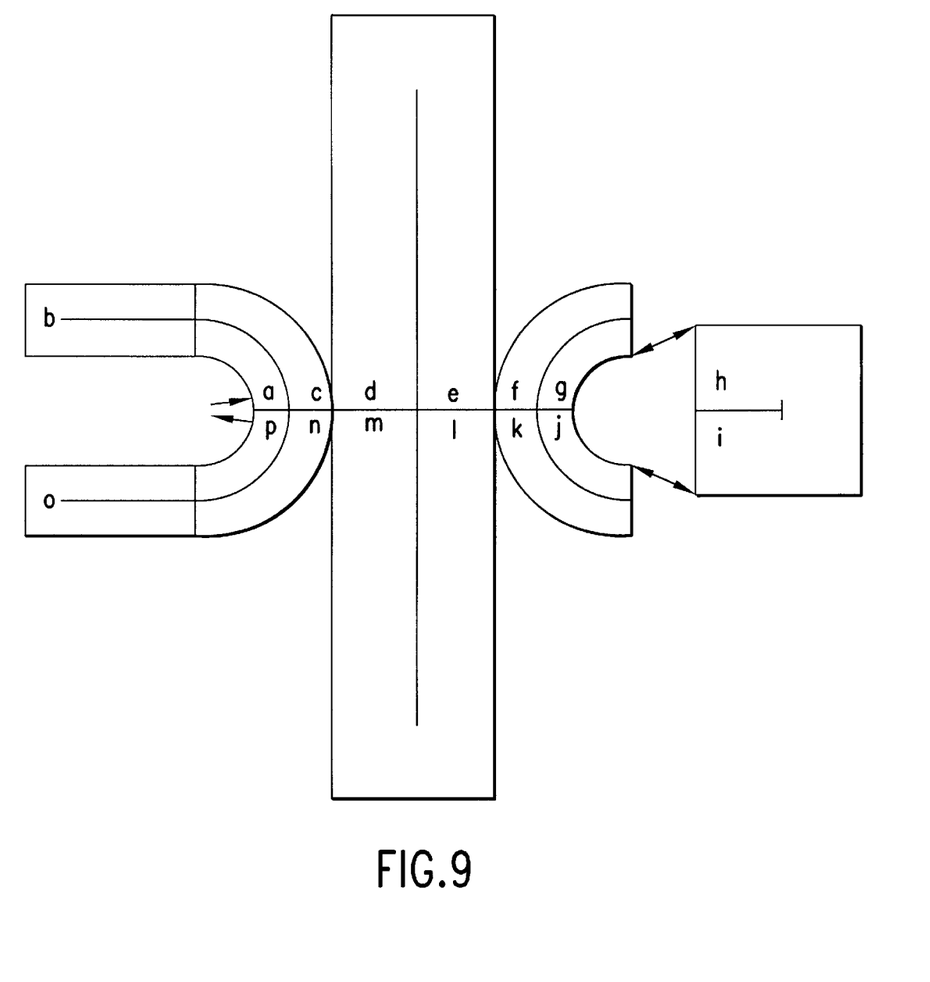
FIG. 9 shows a representation of the double wall casing of hollow segments with a pipe system for cooling, formed by cross members.
Figure 10:
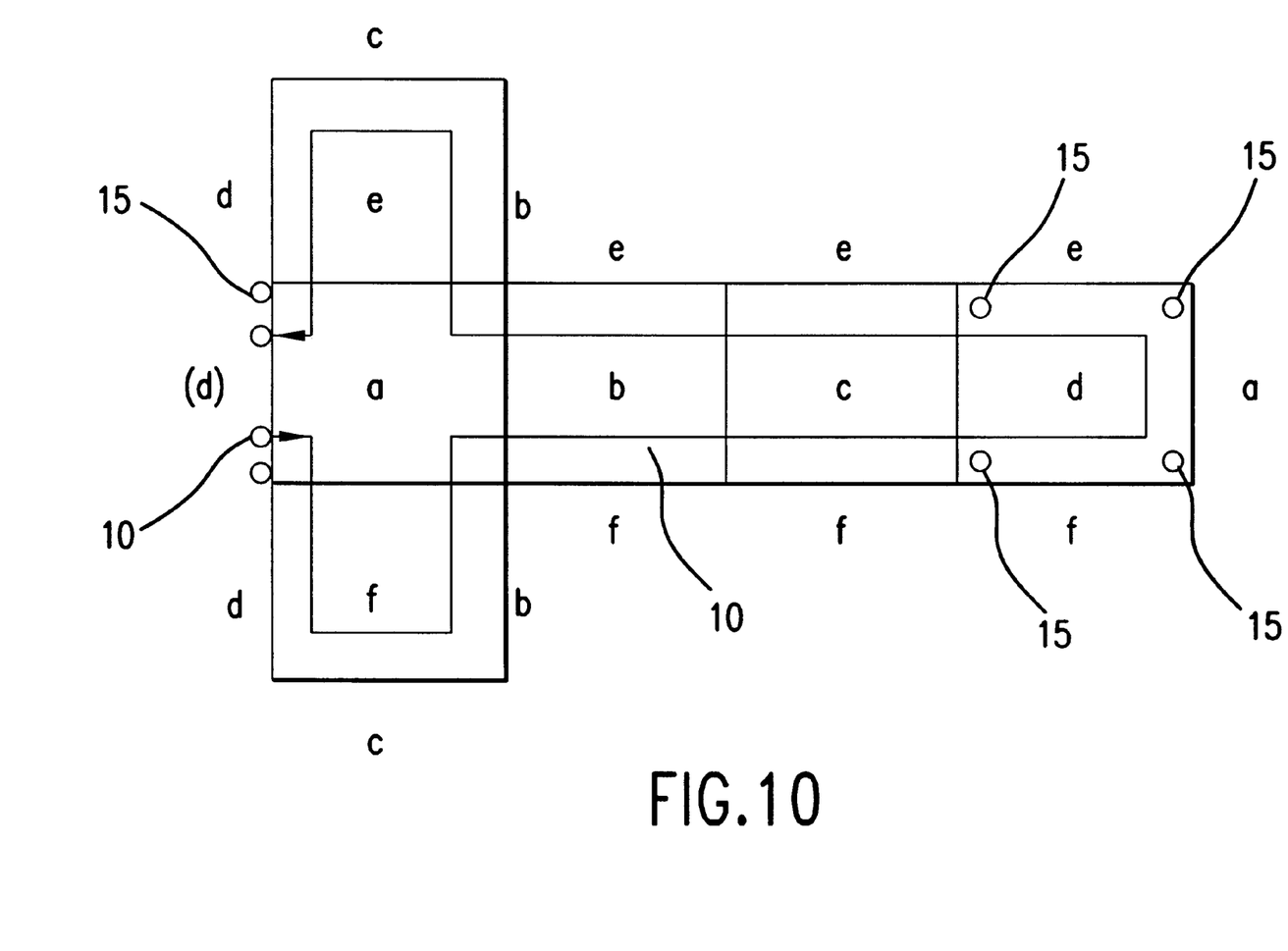
FIGS. 10 and 11 show a single wall casing with a mounted cooling coil.
Figure 11:
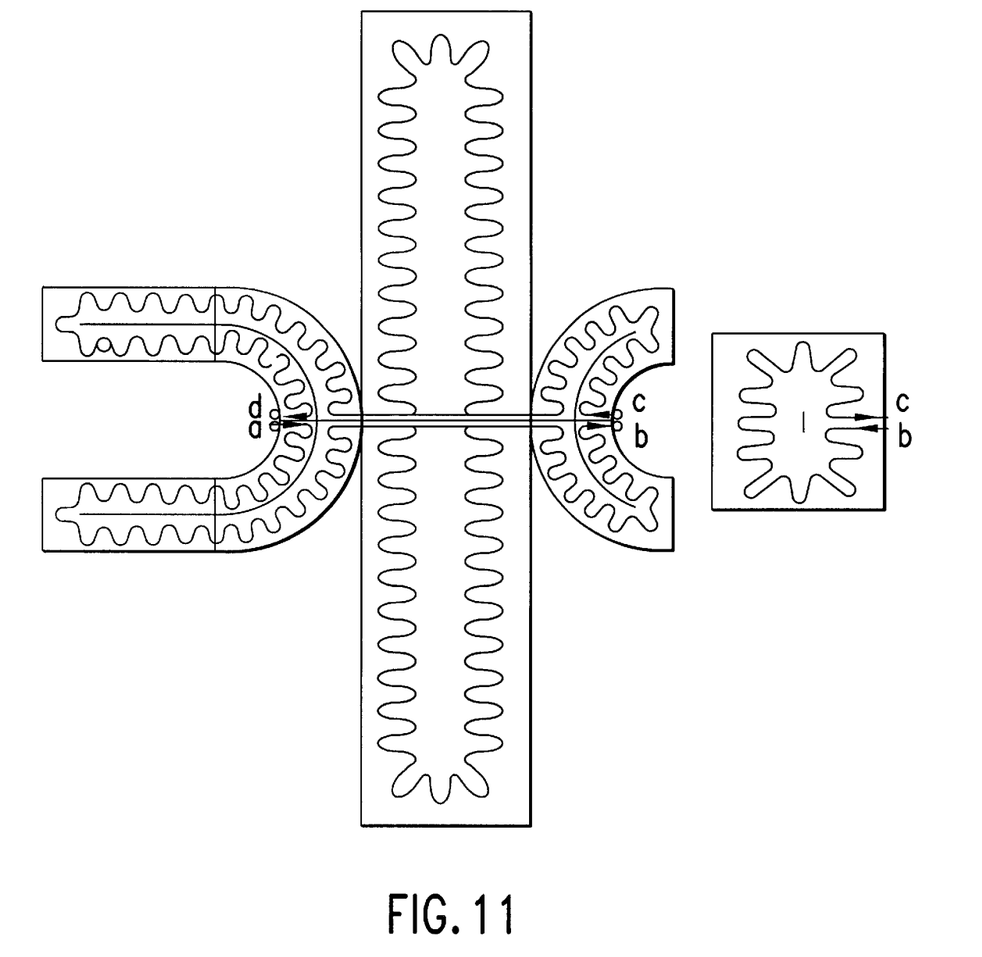

The walls of hollow cylinder rings as shown in FIG. 8 or hollow cylinder segments as shown in FIG. 9 can always be provided with one or several cross members, which are located parallel to the outer periphery, are seated as spacers between the double walls and form the inner boundary of the channels. The cooling medium flows in accordance with the alphabetic labeling from a to g in FIG. 8 or from a to p in FIG. 9. Likewise, cooling coils can always be mounted on single casing walls as shown in FIGS. 10 and 11).

In both cases, the inner channel system or pipeline system is connected with feed pipes, which are outside of the casing and can be passed through the combustion chamber wall. In both cases, quick-acting closures, similar to those in use for liquid rockets, are required. If access is through the wall, these quick-acting closures must also be correspondingly pressure resistant.

Figure 12:
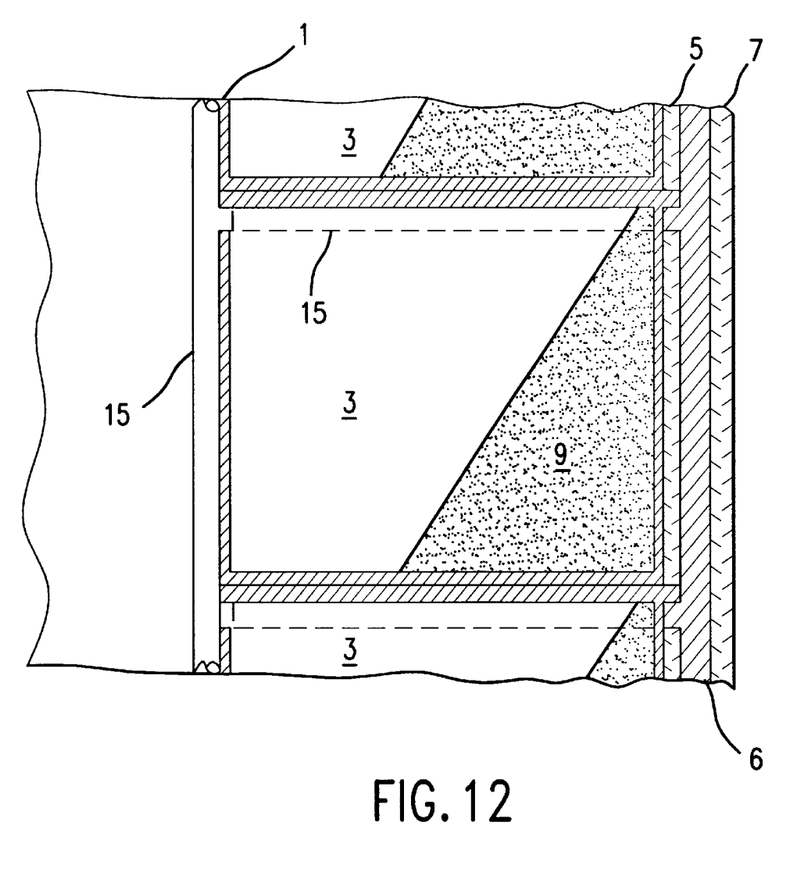
FIG. 12 shows a drainage system (fill-drain system of the casing).

The situation is similar for the feed pipe of the fill-drain system 15 as shown in FIG. 12. However, the feed pipes or discharging pipes of this system are connected only with the highest and/or lowest part of an encased volume. FIG. 12 shows a drainage system, through which the original gas filling (such as helium) can escape while liquid fuel flows in through a similar inlet (not shown).

The given dimensions of the pipes, like all other details in the drawing, are not drawn to scale. The dissipation of heat through the cooling system is the rate-determining step for freezing the fuels and the supply of heat through the combustion channel and the external insulation are the rate-determining st(ps during the slow thawing of the fuels. For this reason, the fill-drain system 15 can use pipes of smaller diameter. This is advantageous, since the whole system, together with the cooling system, is burned during the operation of the motor. In the simplest case, each fuel element requires its own connection to the filling system, because a serial connection (always separated, of course, according to fuel and oxidizer) usually will not be problem-free. Under certain circumstances, however, the serial manufacture with very simple measures is conceivable. For example, the highest and lowest points of the hollow cylinder rings, which arise in the example described here in obliquely placed positions, can be connected with one another. In the case of the uppermost element, the filling system thus ends with a drainage device at the point, which is the highest point in the tilted position.

On the other hand, the drainage system, shown in FIG. 12, connects all fuel elements, with a single outlet and with one connection each and, separately, all oxidizer elements. It functions in the vertical position of the motor and serves only for drainage during thawing and must remain closed during filling with serial inflow.

The procedure, described here, is not intended to exclude the case in which the fuel elements are produced modularly, individually, in special equipment and then integrated in the combustion chamber into a grain or, in the case of a segmented construction, into the combustion chamber. In the event that the integration procedure does not permit a different process, the pipe systems described must, of course, be assembled in themselves in a suitable manner by connections.

It is common feature of all the examples that they are only intended to represent examples of solution for illustrating the principles.

What is claimed is:

1. A modular, cryogenic, radial burning solid rocket propellant system comprising as combustion elements at least one oxidizer element and at least one fuel element;

said fuel and oxidizers elements being capable at most of unstable combustion; and means for providing continuous ignition for sustaining a stable combustion of the at least one oxidizer element and the at least one fuel element for the duration of the operation said rocket.

2. The solid rocket propellant system of claim 1, wherein at least one of said combustion elements comprises a plurality of combustion elements and at least one of said plurality of combustion elements produces reducing or oxidizing gases during the combustion.

3. The solid rocket propellant system of claim 1, wherein at least one of said combustion elements comprises a plurality of combustion elements and said plurality of combustion elements are insulated chemically from one another by a covering at an interface between the fuel elements and the plurality of fuel elements are connected mechanically either each other.

4. The solid rocket propellant system of claim 2 or 3 in combination with a combustion chamber, said combustion chamber having an interior surface having a contour, the plurality of combustion elements having the shape of disks, said disks having an outer surface conforming to the contour of the interior surface of the combustion chamber and said disks comprising at least two boreholes, said boreholes being linked together forming at least one combustion channel having a constant or variable cross-sectional area.

5. The solid rocket propellant system of claim 2 or 3, wherein the plurality of combustion elements are configured in a matrix.

6. The solid rocket propellant system of claim 2 or 3 wherein at least one of the combustion elements does not burn automatically.

7. The solid rocket propellant system of claim 1, 2 or 3, wherein said combustion elements comprises energy-increasing additives.

8. The solid rocket propellant system of claim 1, 2 or 3, further comprising a casing and a fill-drain means, said fill-drain means being configured such that the propellant system can be charged, discharged, stored or operated while said propellant system is provided in said casing.

9. The solid rocket propellant system of claim 8 in combination with a combustion chamber, said combustion chamber having an interior space wherein the casing is connected with extension-resisting elements, said extension-resisting elements providing mechanical support in the interior space of the combustion chamber.

10. The solid rocket propellant system of claim 9, further comprising a pipe system and flowing medium, said flowing medium flowing through said pipe system such that the combustion elements are maintained within a predetermined temperature range until prior to ignition of the propellant system.

11. The solid rocket propellant system of claim 10, further comprising:

thermal insulation on the casing for insulating the casing;

a venting means for discharging the flowing medium of the pipe system if a pressure of the flowing medium increases to above a predetermined point;

wherein said flowing medium flows through said pipe system in the interior space of the casing such that the combustion elements are maintained within a predetermined temperature range if the thermal insulation, venting means or fill-drain means fails.

* * * * *